United States Patent [19]
Crawford et al.

[11] Patent Number: 6,044,882
[45] Date of Patent: Apr. 4, 2000

[54] TIRE HAVING SILICA REINFORCED RUBBER TREAD WITH OUTER CAP CONTAINING CARBON BLACK

[75] Inventors: Michael Julian Crawford, Akron; Donald George Vera, Uniontown; Douglas Blair Dotts, Tallmadge, all of Ohio

[73] Assignee: The Goodyear Tire & Rubber Company, Akron, Ohio

[21] Appl. No.: 08/400,204

[22] Filed: Mar. 7, 1995

[51] Int. Cl.⁷ .................................................. B60C 19/08
[52] U.S. Cl. ..................................... 152/152.1; 152/209.5; 152/DIG. 2
[58] Field of Search ............................. 152/152.1, 209 R, 152/DIG. 2, 209.5; 156/123, 130

[56] References Cited

U.S. PATENT DOCUMENTS

| | | | |
|---|---|---|---|
| 2,339,546 | 1/1944 | Hanson | 152/152.1 |
| 3,768,537 | 10/1973 | Hess et al. | 152/209 R |
| 3,814,160 | 6/1974 | Creasey | 152/209 R |
| 4,007,069 | 2/1977 | Takayanagi et al. | 156/123 |
| 5,066,721 | 11/1991 | Hamada et al. | 525/102 |
| 5,447,971 | 9/1995 | Bergh et al. | 152/209 R |
| 5,518,055 | 5/1996 | Teeple et al. | 152/152.1 |

FOREIGN PATENT DOCUMENTS

| | | | |
|---|---|---|---|
| 341187 | 11/1989 | European Pat. Off. | 152/209 R |
| 56-112306 | 9/1981 | Japan | 152/DIG. 2 |
| 2-45202 | 2/1990 | Japan | 152/209 R |
| 3-7602 | 1/1991 | Japan | 152/209 R |
| 3-65406 | 3/1991 | Japan | 152/209 R |

*Primary Examiner*—Geoffrey L. Knable
*Attorney, Agent, or Firm*—Henry C Young, Jr

[57] ABSTRACT

The invention relates to a rubber tire composed of carbon black reinforced rubber carcass and having a rubber tread which is quantitatively reinforced with silica and which, in turn, has a thin, integral, rubber outer cap on its outer surface which contains a quantitative amount of carbon black. In one aspect, said outer cap, sometimes referred to herein as an outer top cap, extends across the outer surface of the tread which is normally intended to be ground contacting and in an alternative aspect, the outer top cap extends only over the outer portion, namely the peripheral edges, of said tread surface intended to be ground contacting. The outer, carbon black reinforced, rubber tread top cap connects with at least one other carbon black reinforced rubber component of the tire in a manner to provide a path of reduced electrical resistance from said outer tread top cap to the bead portion of the tire carcass and, therefore, such a path from the vehicle to the road surface.

1 Claim, 7 Drawing Sheets

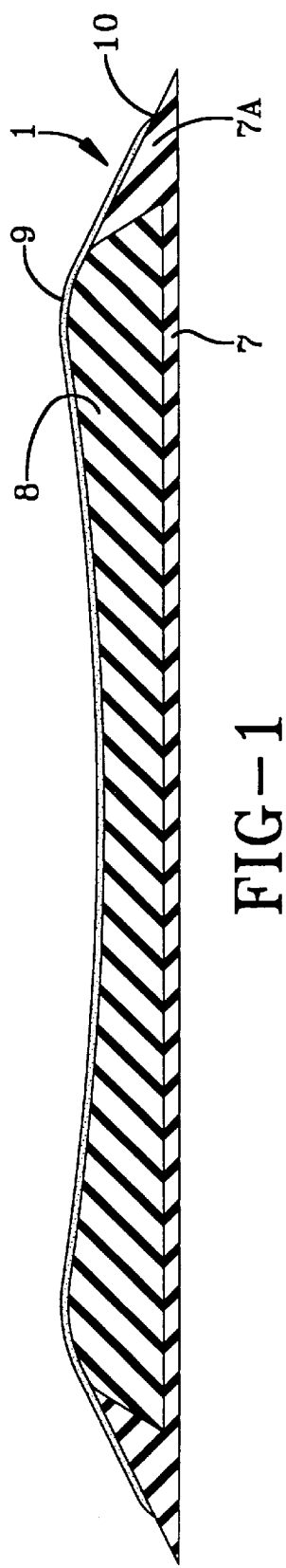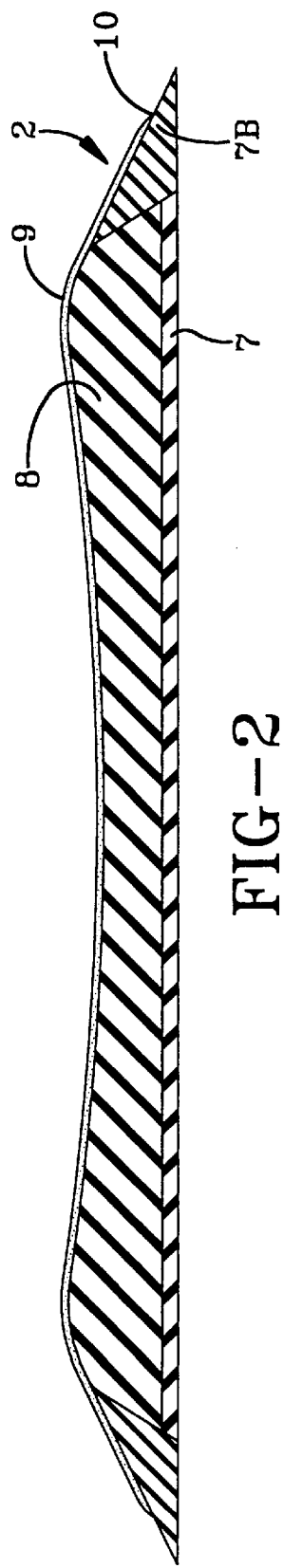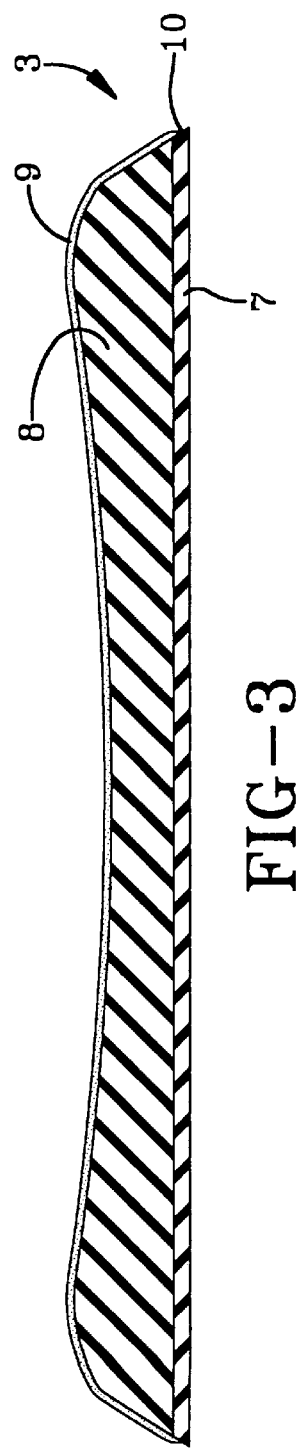

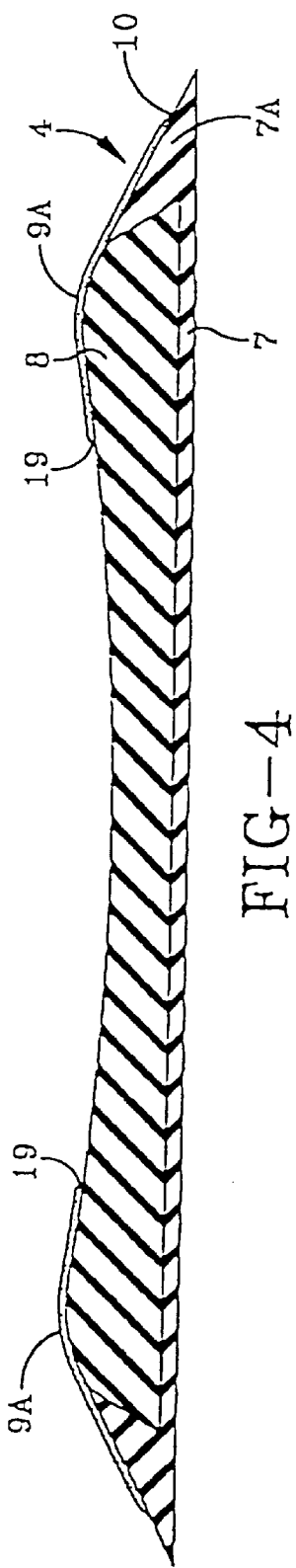
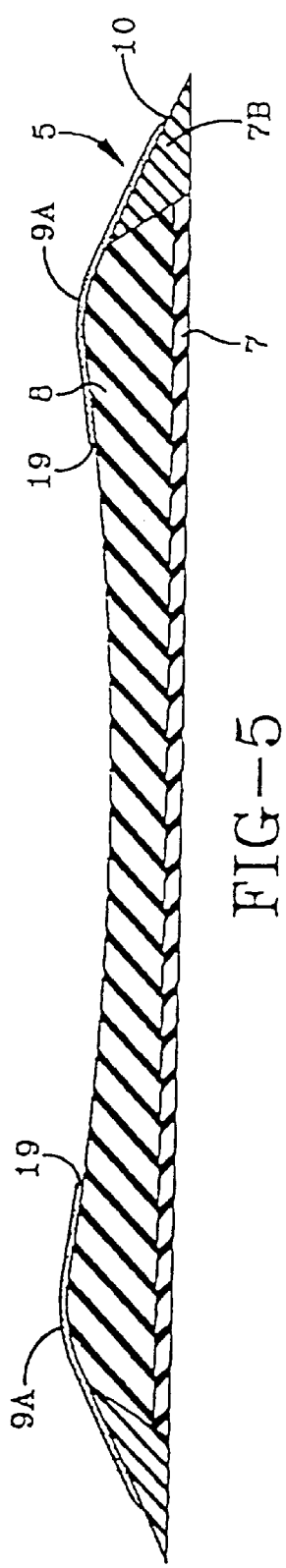
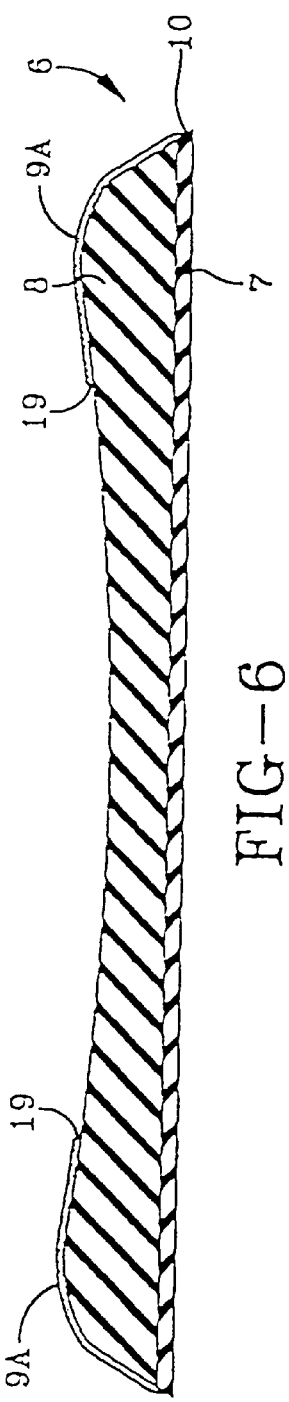

TIRE HAVING SILICA REINFORCED RUBBER TREAD WITH OUTER CAP CONTAINING CARBON BLACK

FIELD

This invention relates to a rubber tire with carbon black reinforced carcass and a rubber tread containing quantitative silica reinforcement and a minimal amount of carbon black, if any, said tread having an thin, integral, rubber outer top cap layer on the outer surface of the tread which is intended to be ground contacting which is composed of rubber which contains a quantitative amount of carbon black and a minimal amount, if any, of silica.

In one aspect, the invention also relates to a rubber tire with sulfur vulcanized, carbon black reinforced carcass and sulfur vulcanized tread of a cap/base construction, and particularly a cap/base-wing construction in which the tread cap is quantitatively reinforced with silica and the underlying base, or base-wing as the case may be, which extends over a portion of the sidewall of the carcass, is carbon black reinforced wherein said tread cap has a thin, integral, rubber outer top cap layer over at least a portion of the tread cap and extends over a portion of an outer surface of the said tread base, or base-wing as the case may be, and may optionally contact the sidewall of the tire carcass, where said thin, integral, rubber outer top cap layer contains a quantitative amount of carbon black and a minimal amount of silica, if any, and is sulfur co-vulcanized with said tread cap and base or base-wing.

The carbon black reinforced integral rubber outer tread top cap, which is integral with the outer surface of the tread in a manner intended to be ground-contacting, may extend across such outer surface of the tire tread or, alternatively, only over the peripheral edges of such outer surface the tread.

The outer tread top cap connects with at least one other carbon black reinforced component of the tire carcass to provide a continuous path of reduced electrical resistance from said outer tread top cap to the bead portion of the tire carcass. Such reduced electrical resistance is in comparison to electrical resistance between the silica reinforced tire tread itself and the bead portion of the tire carcass.

BACKGROUND

Pneumatic rubber tires are conventionally prepared with a rubber tread which can be a blend of various rubbers which are, typically, sulfur curable or sulfur cured as the case may be, diene based elastomers. The tire rubber, including its tread portion, is typically reinforced with carbon black reinforcing filler and with a minimal, if any, of silica.

In one aspect, treads of rubber tires are often prepared of a cap/base construction in which the outer portion of the tread is the cap and the underlying part of the tread between the tread cap and the supporting tire carcass, is its base. The cap portion is usually designed to be ground-contacting and, thus, have associated properties and the base portion generally overlays the tire carcass and is usually designed to support the cap, therefore, not to be ground-contacting. Such cap/base constructions are well known to those skilled in the art.

In one aspect of this invention, a tread of cap/base construction is contemplated in which, for the purposes of this invention, the tread cap is substantially reinforced with silica and the underlying tread base is substantially carbon black reinforced.

In one aspect, the tire tread, or tread base in the case of a cap/base construction may be presented in a form of a base-wing in which a portion of the tread, or tread base as the case may be, extends outward and over a portion of the outer surface of the tire sidewall of the tire carcass.

It is to be appreciated that conventional tread, and tread cap/base, as the case may be, constructions are typically prepared by an extrusion process where, in the case of a cap/base construction, the cap and base are extruded together to form a unified extrusion. Such tread extrusion processes are well known to those having skill in such art.

For the purposes of this presentation, a tire is viewed as being composed of a circumferential tread and supporting carcass therefor. The carcass is viewed as being composed of relatively conventional elements which include but are not limited to carbon black reinforced rubber sidewalls (although a portion of an outer surface of the sidewalls may be colored by an appropriate pigment such as, for example, white titanium dioxide and, thus, not contain carbon black), beads, apex, innerliner and the supporting carcass plies, including fabric reinforced plies. A shoulder region of a tire is considered as being a portion of the tire where its sidewall meets its tread. It is not normally a sharp line of demarkation and its actual position may vary somewhat from tire to tire. The bead portion of the carcass is typically composed of a relatively inextensible bundle of wires which is encased in carbon black reinforced rubber and is designed to contact a metal rim on which the tire itself is mounted to form a tire/rim assembly which itself is conventionally adapted to be mounted on a vehicle, particularly a wheel of a vehicle. The rim is typically steel or aluminum, or alloy thereof and is, thus, electrically conductive since the metal is considered as having a very low resistance to flow of electricity. The term "metal", as used herein for the metal rim, is intended to mean electrically conductive metals such as, for example, the aforesaid steel and aluminum rims as would be understood by those having skill in such art.

By the term "carbon black" reinforced, it is meant that the rubber components of the tire carcass rubber which are carbon black reinforced, contain a quantitative amount of carbon black reinforcement, normally at least 25 phr, and a minimal amount, if any, of silica and the weight ratio of carbon black to silica is at least 5/1.

It is acknowledged that, in some tire constructions, carbon black reinforced rubber components such as, for example, components which are sometimes known as chippers and chafers may be positioned in the bead area or region of the tire construction to assist in cushioning the bead component against the metal rim. In the context of this description, a reference to the aforesaid bead component of the tire carcass is intended to include such other associated rubber components unless otherwise indicated, and thereby are a part of the tire carcass.

In practice, as is well known to those having skill in such art, the tire, which may sometimes be referred to as a pneumatic tire, is mounted on the metal rim and air pressure is applied to the cavity enveloped by the metal rim and the pneumatic tire carcass.

The hereinbefore construction elements, or components, of a pneumatic tire and tire carcass, as well as such tire/rim assembly, are also well known to those familiar with such tire art.

It is important to appreciate that uncompounded rubber by itself is generally considered as being, substantially, an electrical insulator or, in other words, a rather poor conductor of electricity.

A carbon black reinforced rubber vehicular tire, while still providing a degree of resistance to flow of electricity, has a considerably higher electrical conductivity, or lower resistance to flow of electricity, than rubber without the carbon black reinforcement.

It is considered herein that a continuous relatively low electrical resistance path is created between the electrically conductive metal rim of a tire/wheel (tire/rim) assembly to the outer tire tread surface, and thence to the ground via the carbon black reinforced rubber of the tire, including its ground-contacting tread component, for such a tire/rim assembly mounted on a vehicle which is intended to travel over the ground.

In this manner, it is considered herein that potential electrical energy, which may potentially be created by components of or within a moving vehicle as its rotating wheels and associated tire/rim assemblies as they travel over the ground, is dissipated from the rim of a tire/rim assembly on the vehicle to the ground via the carbon black reinforced rubber path of the tire carcass and tread, or tread cap of a tread of a cap/base construction, which tread or tread cap, as the case may be, is normally the outer rubber surface of the tire intended to be ground contacting.

Thus, in one aspect, it is considered herein that the carbon black reinforced rubber of the tire carcass and associated tread normally provide a sufficiently low electrical resistance path to dissipate potential electrical energy and, thereby, retard or eliminate static electrical charge from building up and/or accumulating under dynamic conditions of a rotating tire on a vehicle traveling across the ground.

Alternatively, in practice, carbon black reinforced rubber tires may sometimes be prepared which have outer rubber treads designed to be ground contacting which are quantitatively reinforced with silica and, thus, contain only minimal amounts such as, for example, 15 phr or less, of carbon black.

In such silica reinforced tire tread construction, although the various other rubber components of the tire, namely, the aforesaid overall tire carcass, are quantitatively reinforced with carbon black with a minimal amount, if any, of silica and, thus, may have a relatively low electrical resistance on the order of one megohm or less whereas, the silica reinforced tread itself may have a substantially high electrical resistance on an order of at least one thousand megohms and, thus, such tread creates a degree of electrical insulating effect between the tire carcass and ground. Such a tire construction has a substantially less tendency to dissipate static electricity from the tire to the ground, and particularly from the metal rim of a tire/rim assembly to the outer surface of the tire tread and thence to the ground, which may be generated by a dynamic condition of the rotation of the tire on a moving vehicle. Accordingly, a potential for static electricity to build-up, or increase, is considered to be higher for such a tire construction with a silica reinforced tread than for a similar tire with a carbon black reinforced tread.

Therefore, it is desirable to provide a suitable path of relatively low electrical resistance between the tire bead portion and the tread outer surface for such a tire having a quantitative silica reinforced rubber tread and minimal, if any, carbon black reinforcement.

While the dissipation of generated electrical energy may not be completely understood, it is believed that, insofar as a vehicular tire is concerned, electricity may be transmitted primarily from the metal rim, of steel or aluminum, for example, thence on or through the carbon black reinforced rubber surface of the tire carcass to the outer surface of a carbon black reinforced rubber tread and thence to the ground.

It is acknowledged that it might be thought of to apply an organic solvent based or water based coating of carbon black-containing rubber composition over the outer surface of the quantitative silica reinforced rubber tread to facilitate a path of relatively low electrical resistance connecting the tire's carbon black reinforced rubber sidewall region to the outer tread surface, and thence the ground as the tire rotates on the vehicle. Indeed, elastomer/carbon black coatings, which may be applied as either water-based or organic solvent-based compositions and which are sometimes called pre-cure paints, are often applied to various surfaces of green, or unvulcanized, tire construction before the tire is vulcanized in a suitable mold. A purpose for such pre-cure paints might be, for example, to reduce friction between the tire and its associated vulcanization mold and increase air bleed between the tire and mold during the vulcanization operation. For example, see U.S. Pat. Nos. 4,857,397 and 4,329,265.

However, it is recognized that a thin outer rubber coating, if applied to a tire tread surface, will relatively quickly wear away as the tire is used, leaving the coating on surfaces within the grooves in a tire tread which typically has a lug/groove design or configuration. Thereby, it is considered herein that only a very small portion of the coating, namely the thickness of the coating on the walls of the tire tread lugs, is actually available to be directly presented to, or contact, the ground to facilitate a relatively low electrical resistance from the tire to the ground for a tire with tread which is quantitatively reinforced with silica.

It is, therefore, considered herein that in order to be practical, the carbon black reinforced tread outer top cap layer over the outer surface of the silica reinforced rubber tread should be a thin carbon black-containing rubber layer integral with the tread and, thus, having good adhesion to the tread, particularly within the tire tread grooves including the lug walls, and present a sufficient cross-sectional thickness, or surface area, to the ground of the outer top cap layer on the tire lug walls to be effective after the said layer wears away from the outer surface of tread lugs.

In one alternative aspect, for a tire tread conventionally configured with a combination of lugs and grooves, it is desired that the grooves connect directly or indirectly with the carbon black reinforced rubber shoulder of the tire, the area of the tire where the sidewall and tread meet, in order for the carbon black reinforced outer cap layer to more fully connect with the carbon black reinforced rubber portion of the tire, namely, the tire carcass and including the tread base in the case of a tread cap/base construction.

In a tire tread cap/base construction, which is well known to those having skill in such art, and for the purposes of this invention, it is envisioned that the cap is substantially silica reinforced and its base is substantially carbon black reinforced.

In practice, it is desirable that the rubber outer tread top cap layer (i) contains a quantitative amount of carbon black and is of a relatively low electrical resistance to aid in dissipation of electrical energy under the aforesaid conditions, (ii) is co-vulcanized with the rubber tire tread in order that it be integral with the tread and the walls of grooves of a tire tread configuration composed of lugs and grooves, (iii) be relatively thin so that it does not appreciably affect the tread properties of the tread, and (iv) be thick enough so a cross-section of the layer on the walls of a lug in a tread of a lug and groove configuration can present a suitably low electrical resistance to the ground so that it is not necessary to limit the selection of carbon blacks to carbon blacks with exceptionally low electrical resistance. Indeed, it is expected that the outer cap rubber composition will wear off of the outer surface of tire tread lugs during use of the tire so that the cross-section, or thickness, of the outer cap layer on the lug walls is relied upon to present a path of relatively low electrical resistance from the tread to the ground.

As used herein, the terms "quantitatively reinforced with silica", "quantitative silica reinforced rubber" and the like are generally used in conjunction with a tire tread, and with a rubber tire tread cap, in a tread cap/base construction, which contains about 30 to about 100, sometimes preferably about 30 to about 90 phr, of silica, and which may also optionally contain carbon black in which the carbon black is present in not more than about 20 phr. Often it is preferred that the ratio of silica to carbon black is at least 2/1 and sometimes at least 10/1.

The term "phr" as used herein, and according to conventional practice, refers to "parts of a respective material per 100 parts by weight of rubber". In the description herein, rubber and elastomer are used interchangeably.

In the description herein, the term "vulcanized" or "vulcanizable", may, on occasion, be used interchangeably with the terms "cured" and "curable".

SUMMARY AND PRACTICE OF THE INVENTION

In accordance with this invention, a tire tread is comprised of a longitudinal strip of co-extruded, sulfur vulcanizable rubber laminae composed of (i) a tread, and (ii) an outer top cap over at least a portion of the outer surface of said tread; wherein said tread contains about 30 to about 100, alternatively about 40 to about 90, phr of precipitated silica and, optionally, up to about 20 phr of carbon black and wherein said tread outer top cap contains about 25 to about 100 phr of carbon black having a CTAB value in a range of about 80 to about 150.

In one aspect, it is sometimes preferable that, for the tire tread, the weight ratio of silica to carbon black, if carbon black is used, is at least about 2/1 and preferably at least 10/1.

In further accordance with this invention, a tire tread is comprised of a longitudinal strip of co-extruded sulfur vulcanizable rubber laminae composed of (i) a tread cap, (ii) an underlying tread base, (iii) optionally miniwings, and (iv) an outer cap layer.

In additional accordance with this invention, a pneumatic tire is provided which is composed of a carbon black reinforced rubber carcass containing sidewalls, bead portions and a circumferential rubber tread, wherein said tread is comprised of a co-extruded sulfur vulcanizable rubber laminae composed of (i) a tread, and (ii) an outer top cap layer; wherein said top cap layer contacts at least a portion of said tire carcass and extends over the outer surface portion of said tread designed to be ground contacting; wherein said tread contains about 30 to about 100 phr of precipitated silica and, optionally, up to about 20 phr of carbon black; and wherein said tread outer top cap contains about 25 to about 100 phr of carbon black having a CTAB value in a range of about 80 to about 150.

Such tire is vulcanized whereby the said tread top cap is co-vulcanized and integral with said tread and wherein said tread has a lug and groove configuration.

In one aspect of the invention, such tire is provided wherein the said top cap layer is integral with and circumferentially covers the peripheral outer surface of each side of the outer tread surface designed to be ground contacting and covers less than the total outer surface of the tread. For example, such top cap layer may cover less than fifty percent of the outer surface of the tread.

In another aspect of the invention, such tire is provided wherein the sidewalls of the tire carcass extend over at least a portion of the circumferential extremities of the sides of the tire tread, with the tread's adherent, co-extruded, co-vulcanized top cap layer positioned between said tread and said overlaying sidewall.

In further accordance with this invention, a pneumatic tire is provided which is composed of a carbon black reinforced rubber carcass having sidewalls, bead portions and a circumferential rubber tread of a cap/base construction, wherein said tread is comprised of a co-extruded sulfur vulcanizable rubber laminae composed of (i) a tread cap, (ii) an underlying tread base, (iii) optionally miniwings, and (iv) an outer top cap layer; wherein said tread base and/or miniwings, if miniwings are used, contact the sidewall of the tire carcass, wherein said miniwings, if used, extend over a portion of the sidewall of said tire carcass; wherein said top cap layer contacts and extends from at least a portion of said tread base and/or miniwings in contact with said tire carcass sidewall to and over the outer surface portion of said tread cap designed to be ground contacting; wherein said tread cap contains about 30 to about 100 phr of precipitated silica and, optionally, up to about 20 phr of carbon black; and wherein said tread outer top cap, said tread base and optional miniwings contain about 25 to about 100 phr of carbon black having a CTAB value in a range of about 80 to about 150.

Such tire is vulcanized whereby the said tread top cap is co-vulcanized and integral with said tread cap and also said tread cap and/or optional miniwings and wherein said tread cap has a lug and groove configuration.

In one aspect of the invention, such tire is provided wherein the said top cap layer is integral with and circumferentially covers the peripheral outer surface of each side of the outer tread surface designed to be ground contacting and covers less than the total outer surface of the tread. For example, such top cap layer may cover less than fifty percent of the outer surface of the tread.

In another aspect of the invention, such tire is provided where said tread top cap is integral with and covers the outer surface of said tread base or miniwings, if miniwings are used, provided, however, that the tread top cap layer is exclusive of at least a portion of the circumferential extremity of the tread base, or miniwings are used, which contact the carcass sidewall.

The referenced tread components, namely the tread, tread cap, tread base and miniwings are tread components well known to those skilled in such art. For clarification, reference to the accompanying drawings may be made.

By the terms "co-extrusion" and "co-extruded" it is meant that rubber components are extruded through the same die and not simply separately extruded and, then joined together.

In the practice of this invention, the said tread laminae are formed by co-extrusion at a temperature in a range of about 80° C. to about 150° C., more preferably about 100° C. to about 140° C.

The hot co-extrusion of the tread components is particularly beneficial in creating an integral structure of the laminae not otherwise readily obtainable. In general, co-extrusion of tread cap, tread base and tread miniwings are well known to those skilled in such art.

The outer tread top cap layer typically has a vulcanized thickness on the outer surface of the tread in a range of about 0.005 to about 0.08 cm. This thickness is significant as hereinbefore pointed out.

The outer tread top cap layer is considered to be integral with the tread in a sense that it is both co-extruded and co-vulcanized with the tread. Thus, the outer tread top cap layer is not a simple laminate formed by coating a relatively cold tread with a solvent based rubber composition or by applying a relatively cold pre-extruded rubber strip to a relatively cold tire tread, particularly at temperatures of less than about 50° C., and co-vulcanizing the assembly.

Having the aforesaid tread outer cap formed by co-extrusion with the tread, or with the tread's cap and base in the case of a tread cap/base construction, is considered herein to be a considerable advantage over simply applying a solvent based rubber coating over the tread cap because (i) adhesion of the components of the laminate is considered herein to be better since they are created to form the extruded laminate in their hot, unvulcanized state, (ii) a better co-vulcanization is considered herein to take place, and (iii) a possibility of exposed surface contamination is reduced or eliminated.

In one aspect of the invention, it is desired that the carbon black, particularly for the outer cap layer, be suitably electrically conductive for practical purposes, namely for the rubber composition containing the carbon black to have a suitable electrical resistance to suitably dissipate electrical energy as it is generated. It is considered herein that the electrical resistance of the tire should not be more than, and thus a maximum, of about 100 megohms as measured by Test GT-R which is hereinafter described in Example I.

In practice, the tire of this invention may be characterized in that and with a restriction that said tire without said tread top cap layer has an electrical resistance greater than 200 megohms and said tire with said tread top cap has an electrical resistance of less than 100 megohms, according to Test GT-R, and where said top cap layer has a thickness in a range of about 0.005 to about 0.08 cm.

Suitable carbon blacks contemplated for use in this invention are carbon blacks having sufficient surface area demonstrated by a CTAB value in a range of about 80 to about 150. It is recognized that most carbon blacks typically utilized for tire tread reinforcement purposes possess CTAB values which fall within this range. CTAB surface area values and method determination for carbon blacks are well known to those skilled in such art.

In further accordance with this invention, a tire is provided composed of carcass components comprised of sulfur vulcanized carbon black reinforced elastomers together with an outer circumferential silica reinforced tread having said co-extruded tread outer top cap layer co-vulcanized therewith.

In practice, the tread of such tire has a lug and groove configuration.

In additional accordance with this invention, a carbon black reinforced rubber tire is provided having a tread of cap/base construction characterized in that said tread cap has an outer tread top cap layer on at least a portion of its outer surface in which said tread base tread cap and tread outer cap are, individually, comprised of sulfur curable diene elastomer based compositions with said tread base being primarily carbon black reinforced, said tread cap being primarily silica reinforced and said outer top cap layer being primarily carbon black reinforced rubber composition.

By the term "co-vulcanized" it is meant that the co-extruded tread components are co-vulcanized together and with the rubber tire carcass. Such co-vulcanization is well known to those having skill in such art.

In further accordance with this invention, a method of manufacturing a tire is provided which comprises the steps of (A) co-extruding a tire tread composite as a laminae of a silica reinforced sulfur vulcanizable rubber tread and a thin carbon black reinforced sulfur vulcanizable rubber tread outer top cap layer and (B) applying said tire tread composite onto a tire carcass of carbon black reinforced rubber to form a tire assembly thereof; wherein said thin outer top cap portion is adherent to and extends across at least a portion of the outer surface of said tread intended to be ground contacting and contacts at least one other carbon black reinforced rubber component of the carcass of the tire.

In one aspect, the extruded tire tread portion of the laminae is composed of a cap/base construction in which tread cap portion is a silica reinforced rubber, the tread base portion is a carbon black reinforced rubber and the aforesaid thin outer top cap layer is adhered to at least a portion of the outer surface of the said tread cap intended to ground contacting.

The resultant tire assembly is shaped and sulfur cured in a suitable mold to form a vulcanized tire.

The aforesaid tread top cap layer is designed to form a continuous electrical path of less than 100, preferably less than 20, megohms between itself, and thus the ground when the tire tread is in contact with the ground, and the tire carcass bead portion, including a metal tire rim when the tire is mounted on a metal rim, according to Test GT-R.

While not limited thereto, various sulfur vulcanizable elastomers and combinations thereof may be used in the construction of various elements of the tire.

Elastomers contemplated and homopolymers and copolymers of conjugated diene hydrocarbons and copolymers of conjugated dienes and aromatic vinyl compounds such as, for example, styrene and alphamethylstyrene. Representative of various dienes are, for example, isoprene and butadiene. Representative of various elastomers are, for example, cis 1,4-polyisoprene (natural and synthetic), cis 1,4-polybutadiene, styrene/butadiene copolymers both emulsion and organic solution polymerization prepared copolymers, isoprene/butadiene copolymers, 3,4-polyisoprene, medium vinyl polybutadiene containing about 30 to about 70 percent vinyl content and styrene/isoprene/butadiene terpolymers.

The tire is then constructed by building a co-extruded tread onto a rubber tire carcass. Such construction and building process are well known to those having skill in such art.

Tire assembly is vulcanized in a suitable mold under conditions of elevated temperature, for example, in a range of about 140° C. to 180° C.

The co-vulcanized, carbon black reinforced, rubber tread outer top cap of the tread provides a relatively low path of electrical resistance, as compared to a silica reinforced tire tread and, thus, a path for dissipation of static electricity between the ground and the tire bead portion and thence the metal rim of the vehicular wheel on which the tire may be mounted.

After the tire tread, in service, becomes worn so that the rubber tread outer top cap layer is worn away from the outer surface of the lugs of a tire tread having a lug and groove configuration, the path for dissipation of static electricity is maintained by the outer tread top cap layer on the walls of the lugs of a tread of a lug/groove configuration.

The accompanying drawings are provided for further understanding of the invention, although it is not intended that the invention be limited to the presentation of the drawings. In the drawings:

FIGS. 1, 2 and 3 are a cross-sectional views of extruded, silica reinforced unvulcanized, sulfur curable rubber tread strips, showing an optional cap/base or cap/base-wing construction, having a thin rubber outer top cap portion thereover, which contains a quantitative amount of carbon black reinforcement.

FIGS. 4, 5 and 6 are similar to FIGS. 1, 2 and 3 except that said outer top cap portion covers only a part of the tread surface at the outer edge portions of the tread strip.

Figure 11:
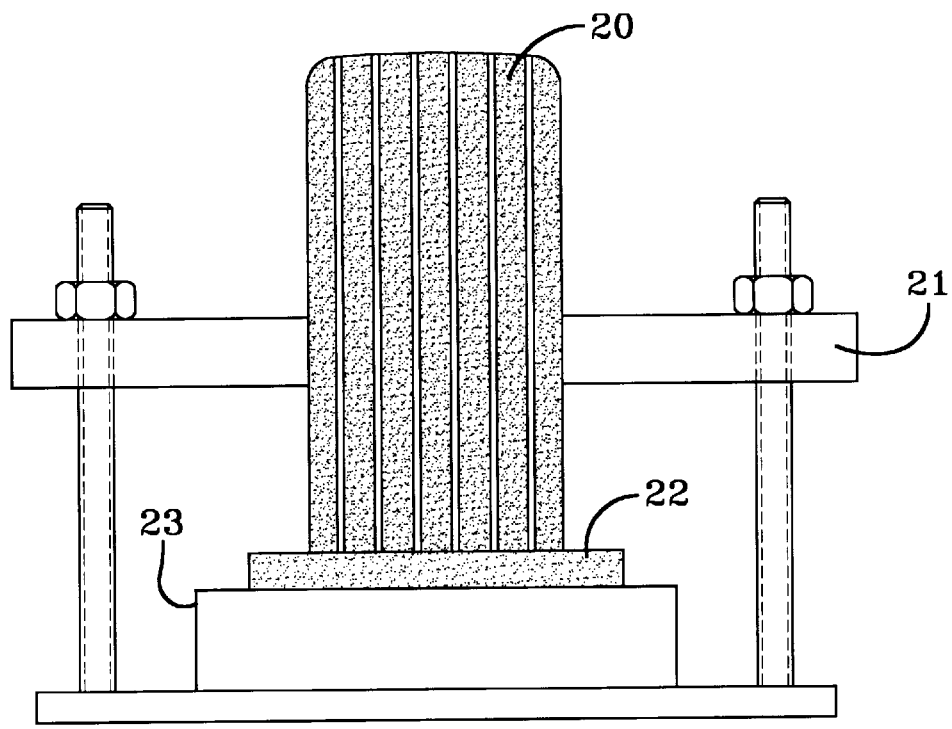
Figure 12:
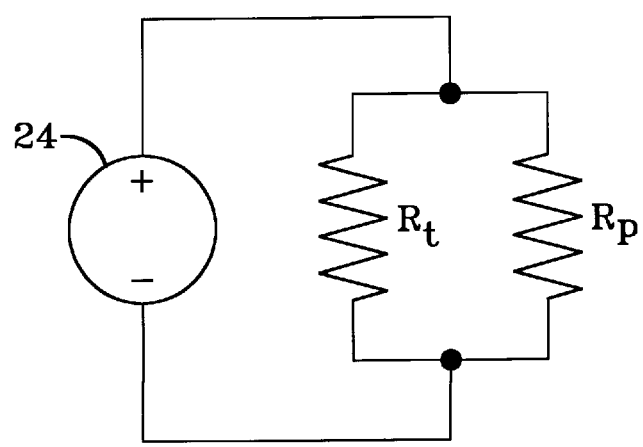

FIG. 11 and FIG. 12 relate to an electrical resistance test hereinafter described in Example I and referred to therein as Test GT-R.

Referring to the drawings, a cross-sections of co-extruded unvulcanized rubber treads 1–6 are shown having portions which will become, after building the tire and upon shaping and vulcanizing the tire in a suitable mold, the tread cap 8, normally intended to be ground contacting, overlaying the optional tread base 7 which supports the tread, and optional miniwings 7A and 7B which may abridge a portion of the tread and sidewall 12 of the tire. Over a portion of the extrusion that will become the tread and over a portion that will become the miniwings 7A or 7B adjacent the tread is a thin, co-extruded rubber outer top cap layer 9 or 9A of rubber which contains a quantitative amount of carbon black and a minimal amount, if any, of silica.

It is important to appreciate that the tread base is an optional, although often desirable, tire tread component. The aforesaid miniwings 7A and 7B are conventionally a part of, or extension of, the tread base in a tread's cap/base construction. The miniwings could be a separately co-extruded component of the tread. Miniwings for a tread cap/base construction are considered herein to be well known to those skilled in the tire building and manufacturing art.

All of the tread components, namely the optional base, cap, outer, integral top cap, and base miniwings if any, are, in practice, extruded together in a multiplex extruder to form the tread strip construction. Such extrusion processes are well known to those having skill in such art.

In practice, the optional rubber tread base 7 is carbon black reinforced, as are the miniwings if any, the rubber tread cap 8, or tread itself in the absence of a base, may be silica reinforced and the aforesaid co-extruded outer rubber cap 9 is carbon black reinforced.

The outer top cap layer extrusion, while it contacts by connecting with, such as by abutting or overlapping the outer surface of the optional base-wing 7A or 7B of the optional tread base 7, may extend to its terminus 10 which is not entirely to the extremity, or extreme edge, of said base-wing 7A or 7B of optional tread base 7.

In one aspect of the invention, as depicted in FIGS. 4, 5 and 6, the co-extruded outer cap layer 9 may only partially cover the tread or tread cap 8, namely, by extending, for example, from its outer terminus 10 to its inner terminus 19.

Figure 7:
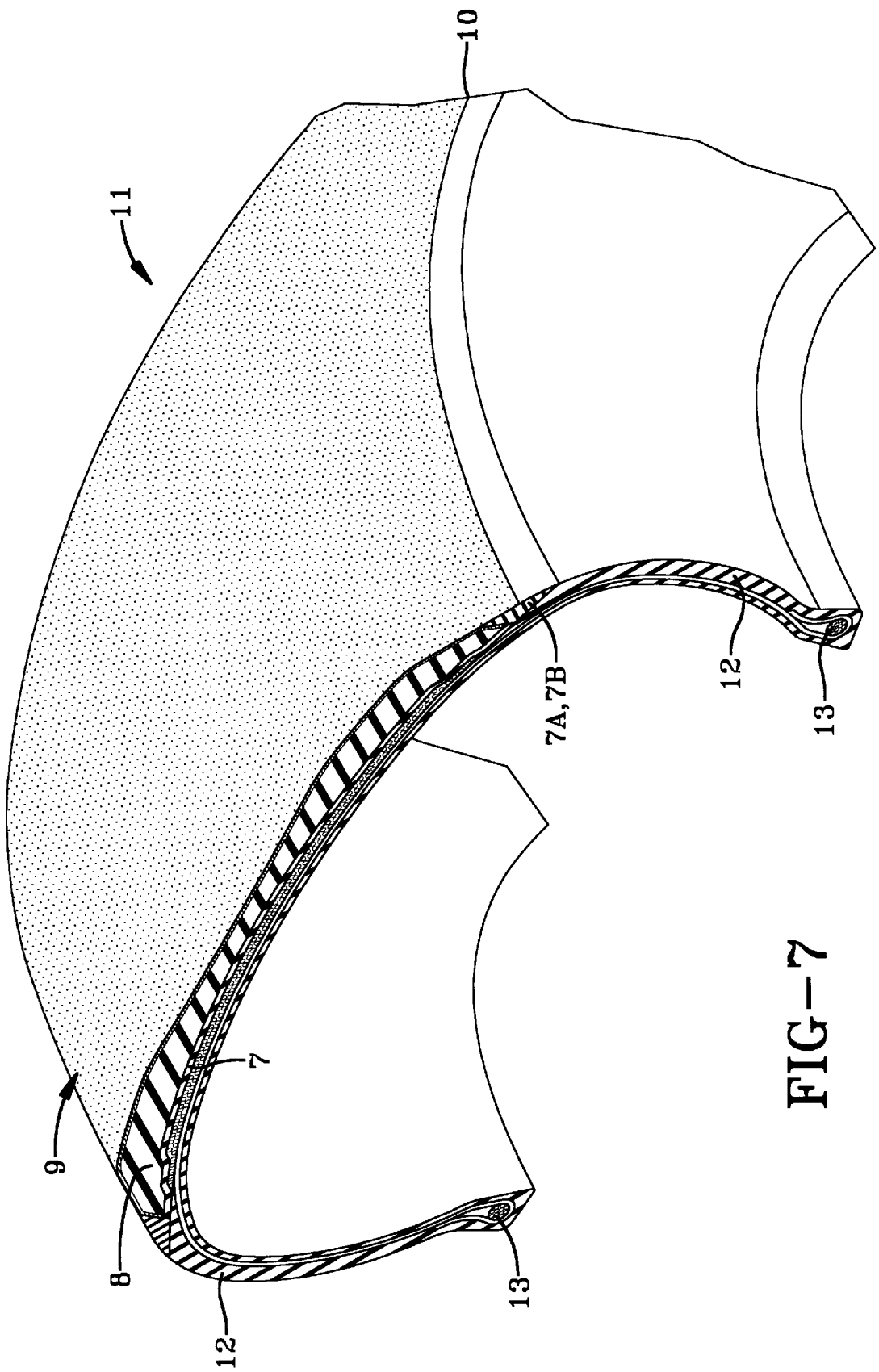
FIG. 7 depicts a cross-sectional, perspective view of a tire with a tread of cap/base construction with the unvulcanized extruded tread strip positioned on the tire carcass.
Figure 8:
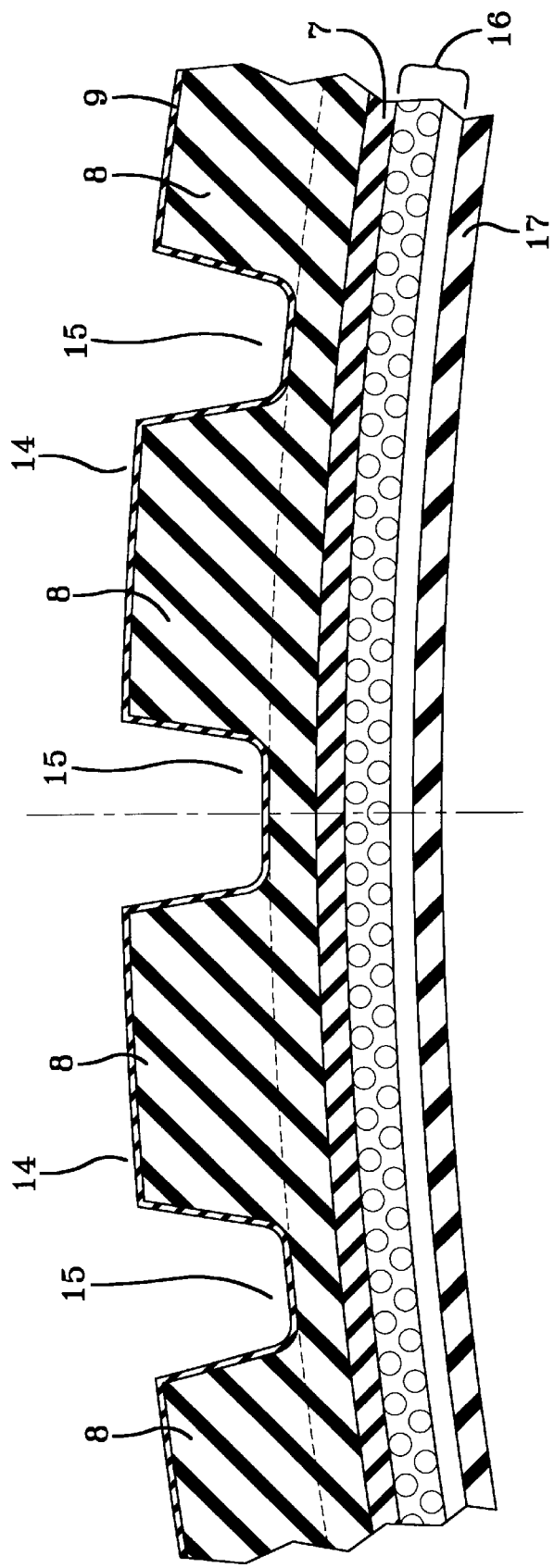
FIG. 8 is a cross-sectional view of a portion of a shaped and vulcanized tire in its tread region, showing the optional cap/base tread construction with a co-extruded outer cap layer thereover, in which the tread's raised lug portions and recessed groove configuration is depicted.
Figure 9:
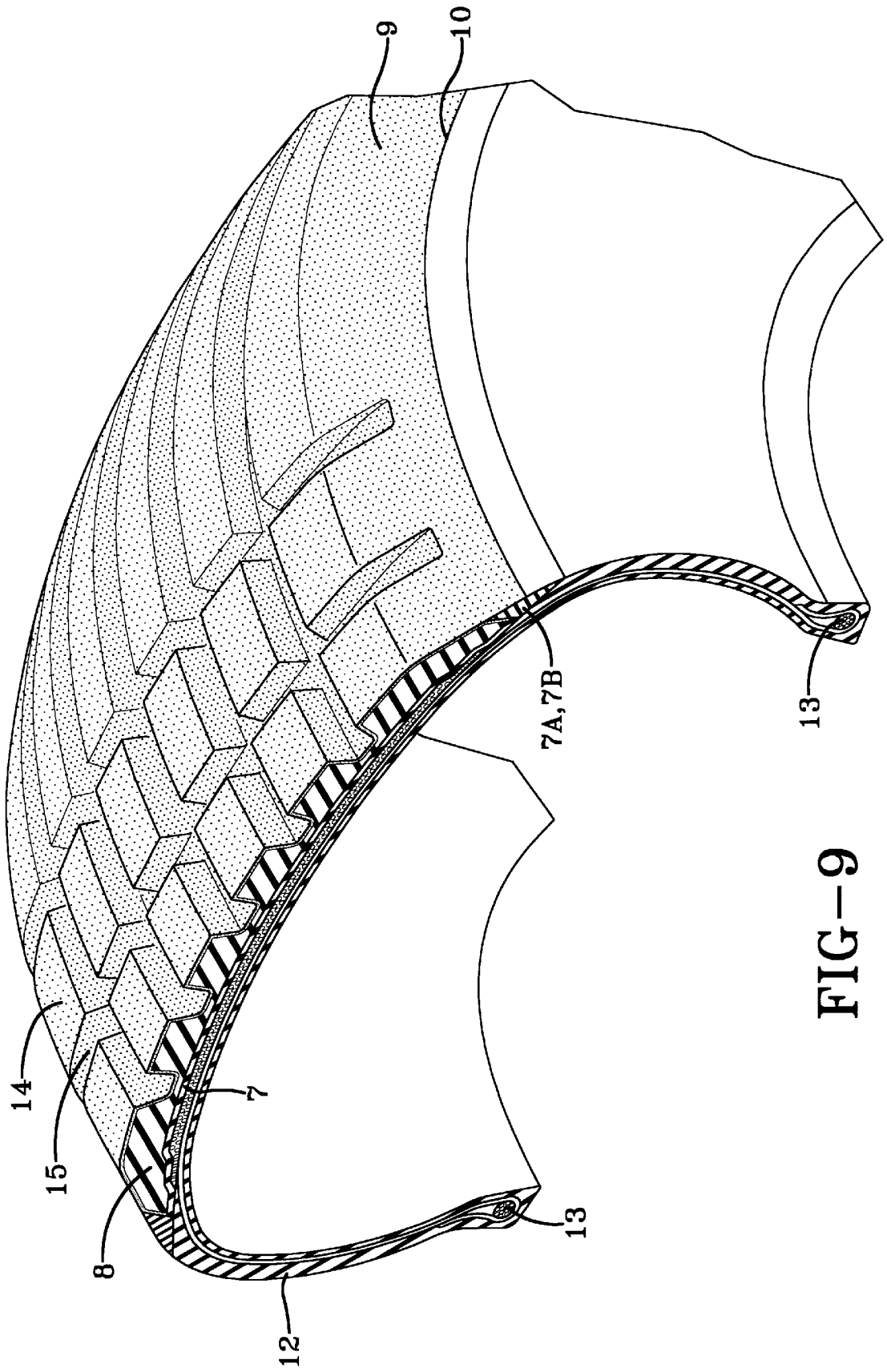
FIG. 9 is a cross-sectional, perspective view of a shaped and vulcanized tire showing the optional cap/base tread construction, with a co-extruded outer top cap layer thereover, together with the tread's lug and groove configuration.
Figure 10:
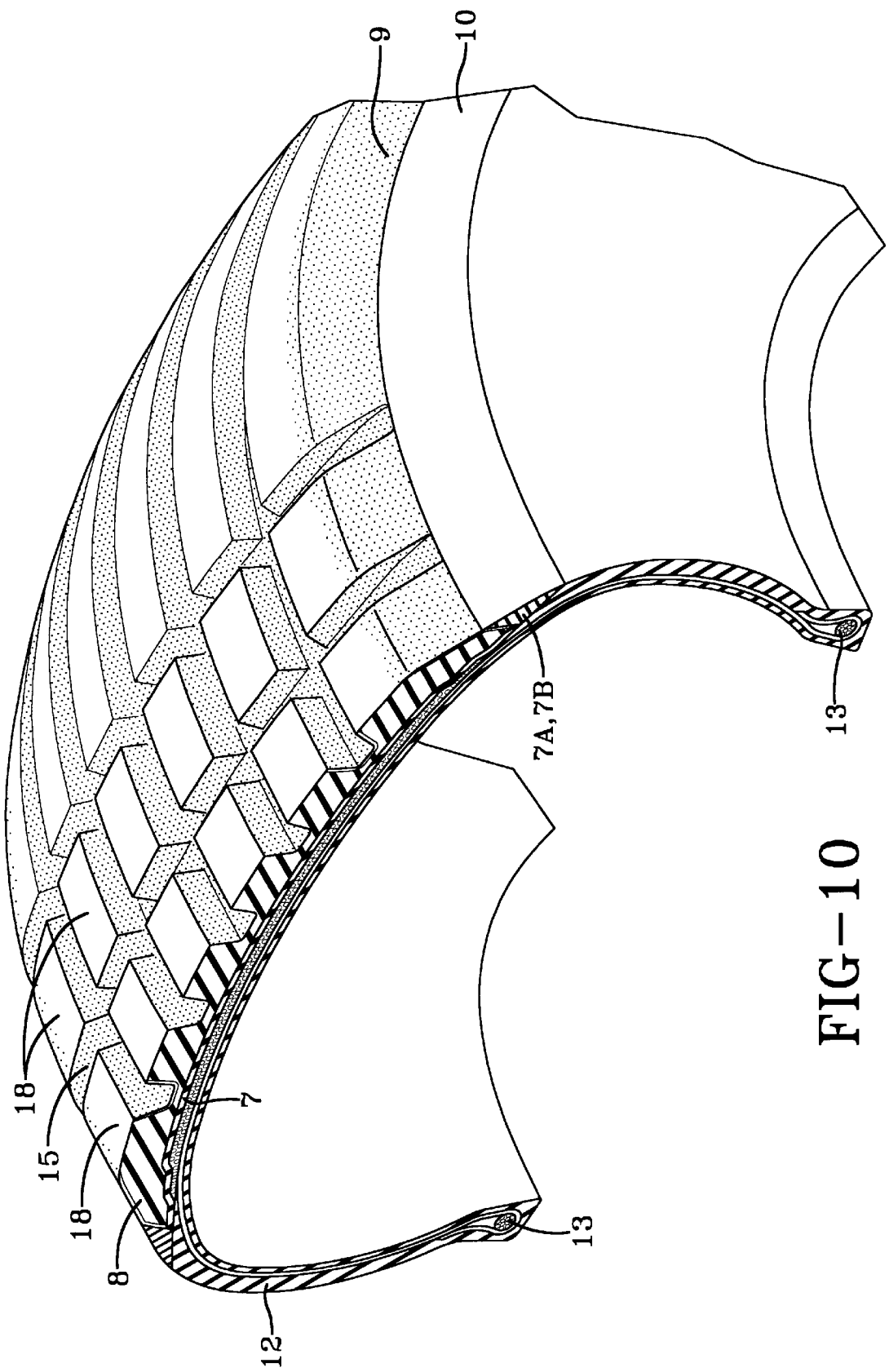
FIG. 10 is similar to FIG. 9 except that it depicts a portion of the aforesaid outer tread top cap layer being worn, or buffed, away.

The tire construction, as depicted in FIG. 7 with the co-extruded tread built onto the tire carcass, is shaped and vulcanized in a suitable mold to form a tire as depicted in FIGS. 8, 9 and 10, having a tread configured with what is referred to herein lugs 14 and grooves 15. The said co-extruded outer cap layer 9, which becomes co-vulcanized with the tire, is shown as the aspect of the invention which covers the outer surface and walls of the lugs 8 and the bottoms of the grooves 15 and its edge 10 extends to and covers at least a portion of the carbon black reinforced rubber of the said miniwings 7A or 7B which now overlay a part of the tire sidewall 12 located in the shoulder region of the tire where the tread and sidewalls 12 join.

As the tire, having been mounted and inflated on a suitable electrically conductive rigid metal rim, itself mounted on a wheel of a vehicle, rolls across the ground, a path for electrical dissipation, is created between the rim to the tread, and thereby the ground, by the aforesaid electrically conductive top cap layer as it contacts at least one other carbon black reinforced rubber component of the tire.

As the said outer top cap 9 on the outer, ground-contacting surfaces of the tread lugs 14 wears away to present a part 18 of the underlaying tread cap 8, an electrical path between the ground and shoulder of the tire is maintained by the said outer cap 9 on the walls of the tread lugs 8, which themselves contact the ground, and further via connecting groove path which extends to the said carbon black reinforced carcass of the tire.

In practice, the commonly employed siliceous pigments used in rubber compounding applications are preferably precipitated siliceous pigments (referred to herein as silica).

The siliceous pigments preferably employed in this invention are precipitated silicas such as, for example, those obtained by the acidification of a soluble silicate, e.g., sodium silicate.

The siliceous pigment (silica) should, for example, have an ultimate particle size in a range of 50 to 10,000 angstroms, preferably between 50 and 400 angstroms. The BET surface area of the pigment, a measurement using nitrogen gas, is preferably in the range of about 50 to about 300, preferably about 120 to about 200, square meters per gram. The BET method of measuring surface area is described in the *Journal of the American Chemical Society*, Volume 60, page 304 (1930).

The silica also typically has a dibutylphthalate (DBP) absorption value in a range of about 100 to about 400, and usually about 150 to about 300.

The silica might be expected to have an average ultimate particle size, for example, in a range of about 0.01 to 0.05 micron as determined by the electron microscope, although the silica particles may be even smaller in size.

Various commercially available silicas may be considered for use in this invention such as, for example, only and without limitation, silicas commercially available from PPG Industries under the Hi-Sil trademark with designations 210, 243, etc; silicas available from Rhone-Poulenc, such as, for example, Zeosil 1165MP and silicas available from Degussa AG with designations such as, for example, VN2, VN3, and 3370.

When quantitative silica reinforcement is desired for a rubber tire tread, particulate, precipitated silica is conventionally used with a coupling agent, or what is sometimes referred to as a silica coupler.

Compounds capable of reacting with both the silica surface and the rubber elastomer molecule, in a manner to cause the silica to have a reinforcing effect on the rubber, many of which are generally known to those skilled in such art as coupling agents, or couplers, are often used. Such coupling agents, for example, may be premixed, or pre-reacted, with the silica particles or added to the rubber mix during the rubber/silica processing, or mixing, stage. If the coupling agent and silica are added separately to the rubber mix during the rubber/silica mixing, or processing stage, it is considered that the coupling agent then combines in situ with the silica.

In particular, such coupling agents may, for example, be composed of a silane which has a constituent component, or moiety, (the silane portion) capable of reacting with the silica surface and, also, a constituent component, or moiety, capable of reacting with the rubber, particularly a sulfur vulcanizable rubber which contains carbon-to-carbon double bonds, or unsaturation. In this manner, then the coupler acts as a connecting bridge between the silica and the rubber and thereby enhances the rubber reinforcement aspect of the silica.

In one aspect, the silane of the coupling agent apparently forms a bond to the silica surface, possibly through hydrolysis, and the rubber reactive component of the coupling agent combines with the rubber itself.

Numerous coupling agents are taught for use in combining silica and rubber, such as for example, silane coupling agents containing a polysulfide component, or structure, such as bis-(3-triethoxysilylpropyl)tetrasulfide.

It is readily understood by those having skill in the art that the rubber composition of the tread rubber would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typically additions of carbon black, for this invention, if used, are hereinbefore set forth. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5, sometimes from 2 to 2.5, being preferred.

Accelerators are used to control the time and/or temperature required for vulcanization and to improve the properties of the vulcanizate. Retarders are also used to control the rate of vulcanization. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary or and a secondary accelerator might be used, with the secondary accelerator being used in amounts of about 0.05 to about 3 phr, for example, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not considered to be an aspect of this invention which is more primarily directed to the use of silica as a reinforcing filler in combination with a coupling agent.

The presence and relative amounts of the above additives are not considered to be an aspect of the present invention which is more primarily directed to a tire with a tread outer cap of carbon black reinforced rubber over a silica reinforced portion of the tread to provide a path of relatively low electrical resistance from the outer surface of the tread to the bead portion of the tread.

The tire can be built, shaped, molded and cured by various methods which will be readily apparent to those having skill in such art.

The invention may be better understood by reference to the following examples in which the parts and percentages are by weight unless otherwise indicated.

EXAMPLE I

Electrical resistance of a tire, for the purposes of (i) this invention, is measured with the assistance of an electrically conductive rigid metal (steel or aluminum alloy, for example) rim onto which the tire is mounted, (ii) a flat copper plate onto which the tire of a rim and tire assembly is pressed, (iii) an applied voltage and (iv) an instrument for measuring the associated electrical resistance between the rim and the aforesaid copper plate.

The test prescribed herein is designated herein as Test GT-R. Such test is not, at this time, a prescribed ASTM or tire industry association test procedure.

Apparatus 1. thin, flat copper strip having a length and width of about 3 and about 0.5 inches, respectively, positioned between the metal wheel rim and tire bead;
2. flat copper plate having a thickness of about 0.25 inch and length and width of about 18 and about 13 inches, respectively;
3. machine grade Lexan® (General Electric) polycarbonate plastic block, which is relatively clear, having a thickness of about one inch and a length and width of about 21 and about 18 inches, respectively;
4. voltage source and resistance meter instrumentation (AEMC Megohmeter Model 5000, Boston, Mass.);
5. appropriate copper connective wiring;
    (a) from the copper strip to the Megohmeter; and
    (b) from one corner of the copper plate to the Megohmeter;
6. tire;
7. electrically conductive steel wheel rim; and
8. apparatus for pressing the tire/rim assembly against the copper plate and associated pressure measuring instrument.

For an understanding of the test procedure, reference is made to FIG. 11 which is a diagrammatic, simplified representation of a portion of the overall apparatus and FIG. 12 is a simplified electrical diagram associated therewith.

Referring to the simplified drawings, the tire 20 is mounted on a steel rim and inflated with air pressure to 100 percent of a Tire & Rim Association (T&RA) design inflation for the particular tire to form a tire/rim assembly thereof. The T&RA specifications for various tires are well known to those having skill in such art.

The copper plate 22 is centered on a surface of the polycarbonate plastic block 23 and affixed to the block 23 with very small metal screws at each of the four corners of the plate 22.

The tire/rim assembly is positioned on an adjustable apparatus 21 composed of an electrically conductive metal crossbar fitted through the rim of the tire/rim assembly, adjustable electrically conductive metal uprights which are affixed to a bottom electrically conductive plate, or platform. The polycarbonate plastic block 23 with its copper plate 22 is positioned on the said metal plate, or platform of the apparatus 21. The tire 20 of the tire/rim assembly is positioned onto the said copper plate 22. Force is applied by the apparatus 21 via adjusting its said metal uprights and thereby causing the said metal crossbar to press the rim of the tire/rim assembly and to thereby force the tire 20 against the copper plate at 85 percent of the tire's T&RA design load.

One insulated copper wire is connected between the Megohmeter to the aforesaid copper strip and one insulated copper wire is connected between one corner of the aforesaid copper plate to the Megohmeter.

Voltage (DC voltage) is applied via the wires to the aforesaid copper strip and to the copper plate.

The electrical resistance of the tire is determined by solving the formula for parallel resistances of (i) the tire and (ii) Lexan® block:

$$Rm = \frac{R_t * R_p}{R_t + R_p} \text{ where}$$

$R_p$ is the electrical resistance of the copper plate/Lexan® block assembly, or in this case, 1500 G Ohms;

$R_t$ is the tire resistance; and

Rm is the resistance measured by the Megohmeter.

Procedurally, a constant current of about 33 microamps is initially applied, with a variable voltage of up to about 1300 volts, by the Megohmeter to the aforesaid copper strip and to the aforesaid copper plate. The resistance (Rm) is read directly from a meter on the instrument. This initial procedure is generally sufficient for tires with carbon black reinforced rubber carcasses and carbon black reinforced treads, including tread caps and bases for treads of cap/base constructions.

However, for tires having treads with outer tread caps which are substantially silica reinforced, the electrical resistance may be too great to be readily measured by reading the instrument's meter. In such circumstance, an increased DC voltage of 5000 volts is applied and the resistance (Rm) is then read directly from the instrument's meter.

EXAMPLE II

Pneumatic rubber tires, identified herein as Tires A, B, C and D, were prepared of a P225/60R16 type and size. All of the tires had identical carbon black reinforced rubber carcasses with associated beads and sidewalls. All of the tires had treads of a cap/base-wing construction. All of the treads had the same surface configuration of lugs and grooves, with the grooves connecting with the tires' sidewalls in the shoulder region.

All of the tire treads were composed a co-extruded laminae, composed of (i) tread base-wing and cap or (ii) tread base, cap and full or partial outer cap.

The tires had a tread base-wing composed of carbon black reinforced rubber co-extruded with a silica reinforced rubber tread cap.

The tire identified herein as Tire B had a tread composed of carbon black reinforced rubber base co-extruded with a rubber cap, which was quantitatively reinforced with precipitated silica, together with a carbon black reinforced outer top cap across the outer surface of the tread cap.

The tire identified herein as Tire C had a tread similar to Tire B except that the co-extruded outer tread cap extended only partially over said tread cap in a manner shown in FIG. 4 of the drawings.

The tire identified herein as Tire D was the same as Tire C except that half the thickness of the tread had been buffed away, thus, removing the outer cap from the outer lug surfaces.

The tires were evaluated for their electrical resistance by the aforesaid Test GT-R.

The compositions for the respective tread base, caps and top cap were comprised of the materials shown in the following Tables 1–3.

Tire A's tread was a co-extrusion of the base shown in Table 1 and cap shown in Table 2.

Tire B's tread was a co-extrusion of the base shown in Table 1, cap shown in Table 2 and top cap shown in Table 3.

Tire C and D's treads were a co-extrusion of the base shown in Table 1, cap shown in Table 2 and partial top cap shown in Table 3.

The aforesaid co-extruded treads were suitably built onto the tire carcasses and the assembly thereof vulcanized in a tire mold at a temperature of about 160° C. for about 15 minutes to form cured pneumatic tires with tread configurations of lugs and grooves.

TABLE 1

(Base)

| | A |
|---|---|
| Tires A, B, C & D | |
| BR[1] | 60 |
| Natural Rubber[2] | 40 |
| Processing Aids[3] | 18 |
| Fatty Acid | 1 |
| Carbon Black, N550 | 50 |
| Productive Mix Stage | |
| Sulfur | 2 |
| Zinc Oxide | 4 |
| Antioxidant(s)[4] | 3 |
| Sulfenamide and Thiuram Type Accelerators | 0.6 |

[1]Cis 1,4-polybutadiene rubber obtained as Budene ® 1207 from The Goodyear Tire & Rubber Company.
[2]Natural rubber (cis 1,4-polyisoprene).
[3]Rubber processing oil, plasticizers, resins and waxes.
[4]Of the di-aryl paraphenylene diamine and dihydro-trimethyl quinoline type.

TABLE 2

(Cap)

| | X |
|---|---|
| Tires A, B, C & D | |
| Non-Productive Mix Stages | |
| E-SBR[1] | 25 |
| Isoprene/Butadiene[2] Rubber | 45 |
| BR[3] | 20 |
| Natural Rubber[4] | 10 |
| Processing Aids[5] | 30 |
| Fatty Acid | 2 |
| Silica[7] | 80 |
| Carbon Black, Tread Type | 0 |
| Coupling Agent[8] | 12 |
| Productive Mix Stage | |
| Sulfur | 1 |
| Zinc Oxide | 4 |
| Antioxidant(s)[6] | 3 |
| Sulfenamide and Thiuram Type Accelerators | 4 |

[1]Emulsion polymerization prepared SBR obtainable from The Goodyear Tire & Rubber Company having styrene contents of about 23 percent.
[2]Isoprene/butadiene copolymer elastomer having a Tg of about −45° C. and an isoprene content of about 50 percent obtained from The Goodyear Tire & Rubber Company.
[3]Cis 1,4-polybutadiene rubber obtained as Budene ® 1207 from The Goodyear Tire & Rubber Company.
[4]Natural rubber (cis 1,4-polyisoprene).
[5]Rubber processing oil as being about 9.4 parts in the E-SBR, where the amount of E-SBR is reported above on a dry weight (without the oil) and in addition, about 14 parts additional rubber processing oil, plasticizers, resins and waxes were added.
[6]Of the di-aryl paraphenylene diamine and dihydro-trimethyl quinoline type.
[7]A silica obtained as Zeopol 8745 from the Huber company.
[8]obtained as bis-3-(triethoxysilylpropyl) tetrasulfide (5% active) commercially available as X50S from Degussa as a 50/50 blend of the tetrasulfide with N330 carbon black (thus, considered 50% active).

TABLE 3

(Top Cap)

| Tires B, C & D | |
|---|---|
| Non-Productive Mix Stages | |
| E-SBR[1] | 90 |
| Natural Rubber[2] | 10 |
| Processing Aids[3] | 40 |
| Fatty Acid | 2 |
| Carbon Black, N220 | 70 |
| Productive Mix Stage | |
| Sulfur | 1 |
| Zinc Oxide | 4 |
| Antioxidant(s)[4] | 3 |
| Sulfenamide and Thiuram Type Accelerators | 4 |

[1]Emulsion polymerization prepared SBR obtainable from The Goodyear Tire & Rubber Company having styrene content about 23 percent.
[2]Natural rubber (cis 1,4-polyisoprene).
[3]Rubber processing oil as being about 33.8 parts in the E-SBR, where the amount of E-SBR is reported above on a dry weight (without the oil) and in addition, about 11 parts additional rubber processing oil, plasticizers, resins and waxes were added.
[4]Of the di-aryl paraphenylene diamine and dihydro-trimethyl quinoline type.

EXAMPLE II

Electrical resistance measurements were conducted on Tires A, B, C and D using the hereinbefore described Test GT-R. The results of the tests are shown in the following Table 4.

TABLE 4

| Tire | Electrical[1] Resistance |
|---|---|
| A | 20,000 |
| B | 3 |
| C | 18 |
| D | 14 |

[1]Megohms.

These electrical resistance measurements demonstrate that, for a tire with tread of silica reinforced rubber, the application of the co-extruded, co-vulcanized top cap layer on the outer surface of the tread significantly reduced the electrical resistance of the tire.

In particular, for a tire with a silica reinforced tread having an electrical resistance of about 20,000 megohms for Tire A, the application of the co-extruded, co-vulcanized, integral top cap layer (i) on the outer surface of the tread for Tire B reduced the electrical resistance of the tire to about 3 megohms, (ii) over a portion of the outer surface of the tire for Tire C reduced the electrical resistance of the tire to about 18 megohms or (iii) over the outer surface of the tread followed by buffing the layer off of the outer surface of the tread lugs for Tire D reduced the electrical resistance of the tire to about 14 megohms. It is recognized that the electrical resistance value for Tire D is less than the electrical resistance value for Tire C, however, these reported values are believed to be within experimental variation.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire composed of (a) carcass components comprised of carbon black reinforced components including a pair of sidewalls and spaced apart bead portions, and (b) an outer circumferential rubber tread of a cap/base construction, characterized in that said tread is comprised of a co-extruded sulfur vulcanizable rubber laminae composed of (i) a tread cap of lug and groove configuration, (ii) an underlying tread base, (iii) a pair of miniwings each outboard of said tread cap and base, and (iv) a pair of thin, outer layers; wherein said tread base and miniwings contact the sidewall of the tire carcass; wherein said miniwings extend over a portion of the sidewall of said tire carcass; wherein said outer layers individually contact and extend over a portion of the outer surface of said miniwings and also extend to circumferentially cover the peripheral outer surface portion of each side of said tread cap designed to be ground-contacting and cover less than fifty percent of said outer portion of said tread cap; wherein said tread cap contains about 30 to about 100 phr of precipitated silica and up to 20 phr of carbon black; and wherein said co-extruded thin, outer layers, tread base and miniwings contain about 25 to about 100 phr of carbon black having a CTAB value in a range of about 80 to about 150; wherein the said thin, outer layers are co-vulcanized and integral with said tread cap and also said miniwings, and wherein said tire with said thin, outer layers has an electrical resistance of less than 100 megohms, according to Test GT-R, and where said thin, outer layers have a thickness in a range of about 0.005 to about 0.08 cm.

\* \* \* \* \*